(No Model.)

A. JUNGHANS.
LANTERN PINION.

No. 508,886. Patented Nov. 14, 1893.

Witnesses:
G. A. Tauberschmidt,
Chas Cannon

Inventor:
Arthur Junghans
By Whitaker & Prevost attys.

UNITED STATES PATENT OFFICE.

ARTHUR JUNGHANS, OF SCHRAMBERG, GERMANY.

LANTERN-PINION.

SPECIFICATION forming part of Letters Patent No. 508,886, dated November 14, 1893.

Application filed March 13, 1893. Serial No. 465,774. (No model.)

*To all whom it may concern:*

Be it known that I, ARTHUR JUNGHANS, a subject of the Emperor of Germany, and a resident of Schramberg, in the Kingdom of Würtemberg, German Empire, have invented new and useful Improvements in Lantern-Pinions; and I do hereby declare the following to be a full, clear, and exact description of the invention, such as will enable others skilled in the art to which it appertains to make and use the same.

This invention is an improvement in lantern pinions and consists in the novel features hereinafter described reference being had to the accompanying drawings which illustrate one form in which I have contemplated embodying my invention, and said invention is fully disclosed in the following description and claims.

This invention relates especially to small lantern pinions such as are used in watches and its object is to strengthen their construction and to enable them to be more readily and securely fastened to their arbors.

Lantern pinions as usually constructed consist of two metal disks, connected by staves which act as teeth. The wheel usually carried upon the same arbor as the pinion can if desired be attached to one of these disks, but in some cases a third disk is necessary. These disks are then turned up and drilled for the reception of the staves which form the teeth. This method of construction is suitable enough for pinions of large diameter but for watch pinions it is unsuitable as the thin disks necessarily used have not sufficient hold upon the arbor and are very liable to become loose in use even if they withstand the turning, drilling and riveting.

Pinions constructed according to this invention completely overcome all these disadvantages as the disks are formed from one piece. A suitable bush or piece of metal is bored to fit upon the arbor and is then turned with two or more grooves, leaving flanges, which replace the disks hitherto used and which are similarly bored and furnished with staves. The said bush is also provided with an integral flange (which may be one of the said disks) which forms the center of a wheel adapted to rotate with the pinion.

Figure 1:
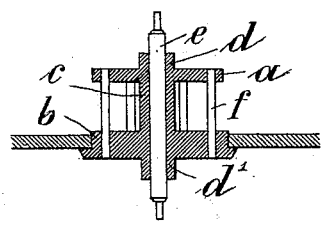
Figure 2:
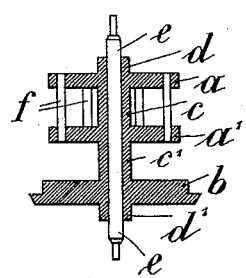
Figure 3:
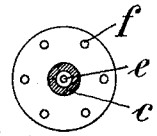

Referring to the accompanying drawings which illustrate in what manner this invention may be carried into effect, Figure 1 shows in section a pinion, one of the flanges or disks of which is formed to carry a wheel. Fig. 2 is a similar section of a pinion provided with a third disk or flange to form the hub or center of the wheel. Fig. 3 illustrates a cross section through one of the improved pinions.

In the form of pinion illustrated by Fig. 1, a brass or other metal bush $c$ is suitably turned so as to leave two flanges $a$, and $b$, the latter of which is represented as forming a center for a wheel. The bush $c$ is accurately bored for the reception of the arbor, $e$, and the disks or flanges $a$, $b$, are drilled and the staves $f$, are riveted or otherwise secured in place in the usual manner.

As illustrated by Fig. 2, the bush $c$ is extended as at $c'$, an intermediate disk or flange $a'$ being formed between the flange $a$ and the wheel center $b$. The bush is bored and secured to the arbor $e$, and the two flanges or disks $a$, $a'$ are drilled for the staves $f$. As in the previous figure the bush may have extensions $d$, $d'$ by means of which the amount of surface in contact with the arbor is increased, thus decreasing the liability to slip or become loose.

A cross section through the lantern pinion is illustrated by Fig. 3.

Lantern pinions constructed as hereinbefore described are especially applicable for use in watches and small clocks where solid pinions have hitherto been employed.

What I claim, and desire to secure by Letters Patent, is—

1. A lantern pinion having a bush for engaging the arbor provided with two integral flanges for the reception of the driving staves, said bush having a part formed integrally therewith for supporting and forming the center of a wheel, substantially as described.

2. A lantern pinion having a bush for engaging the arbor, provided with two integral flanges for the reception of the driving staves, one of said flanges having a portion for engaging and forming the central portion of a wheel, substantially as described.

In witness whereof I have hereunto set my hand in presence of two witnesses.

ARTHUR JUNGHANS.

Witnesses:
PAUL FISCHER,
ERNST DITTAN.